C. G. GRONQUIST.
SPARE TIRE HOLDER.
APPLICATION FILED JAN. 18, 1917.
1,365,588.
Patented Jan. 11, 1921.
SHEETS—SHEET 1.
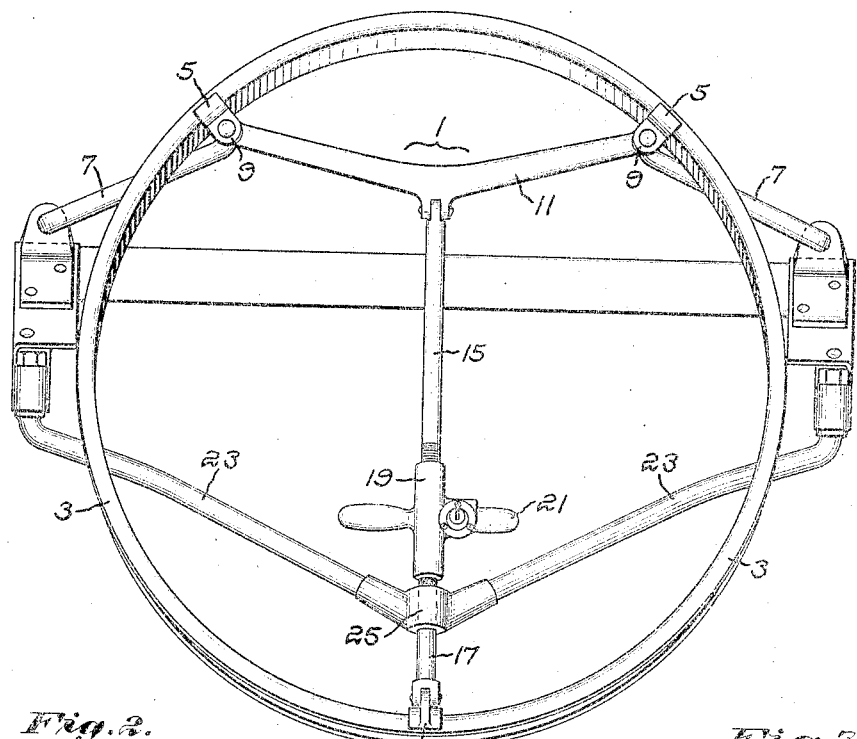
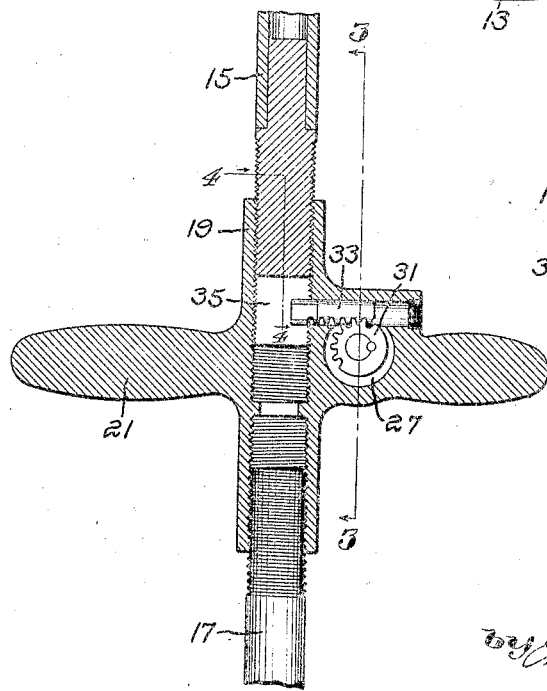
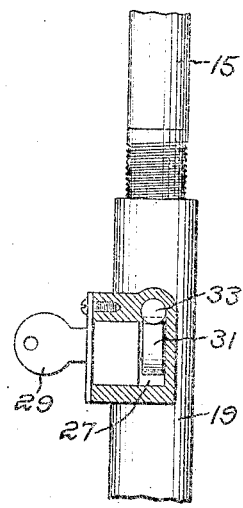
Inventor:
Carl G. Gronquist.
by Emery Booth, Janney & Varney
Attys.

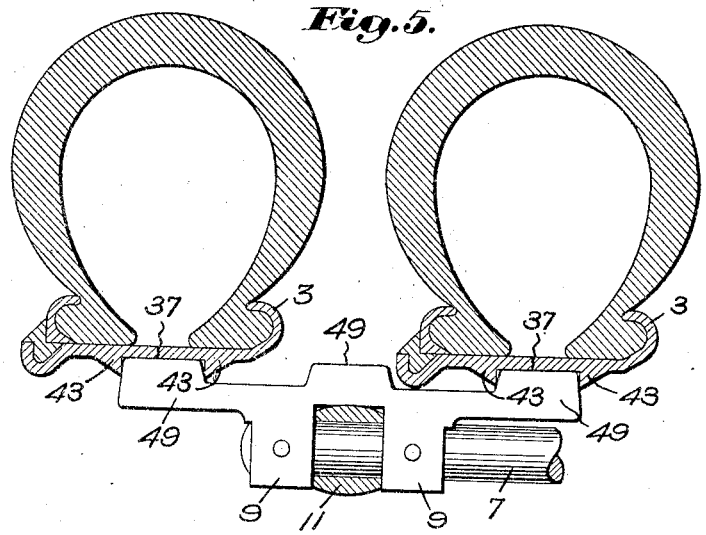
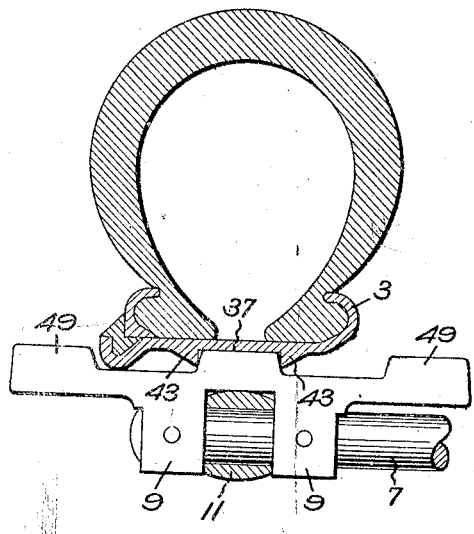
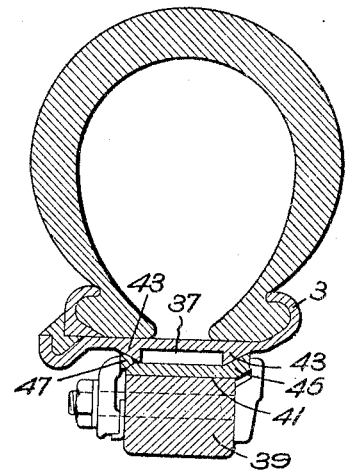

UNITED STATES PATENT OFFICE.

CARL GUSTAVE GRONQUIST, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

SPARE-TIRE HOLDER.

1,365,588.

Specification of Letters Patent.

Patented Jan. 11, 1921.

Application filed January 18, 1917. Serial No. 143,161.

*To all whom it may concern:*

Be it known that I, CARL GUSTAVE GRONQUIST, a citizen of Sweden, and resident of Bridgeport, county of Fairfield, and State of Connecticut, have invented an Improvement in Spare-Tire Holders, of which the following description, in connection with the accompanying drawings, is a specification, like characters on the drawings representing like parts.

This invention relates to a holder for supporting spare vehicle tires in position on a vehicle and the purpose is to provide a structure of this character which will securely hold the tire and one which may, if desired, be furnished with a lock to prevent unauthorized removal thereof.

My invention will be best understood by reference to the following description of one illustrative embodiment of my invention taken in connection with the accompanying drawings, wherein,—

Figure 1 is an end elevation of a portion of a motor vehicle frame with my improved holder attached thereto and a tire-carrying rim in position on the holder;

Fig. 2 is a central vertical section through the adjusting mechanism of the holder, the plane of the section being substantially the central plane of the tire-carrying rim in Fig. 1;

Fig. 3 is a section on line 3—3 of Fig. 2;

Fig. 4 is a section on line 4—4 of Fig. 3;

Fig. 5 is a detail showing how two tires on demountable rims are supported on one form of my device, the tires appearing in section;

Fig. 6 is a similar view showing how one tire is mounted; and

Fig. 7 is a section showing a tire and rim of the kind illustrated in Figs. 5 and 6 mounted on a wheel felly.

The holder of my invention is adapted to engage a tire or the removable rim on which the spare tire is customarily mounted interiorly thereof. Referring to Figs. 1 to 4, in the present embodiment of the invention I provide a suitable support 1 adapted to engage the rim 3 interiorly on one side of a diameter thereof. Herein the support comprises two shoes 5 which engage the rim at the extremities of a chord and are provided with suitable seats to receive the same. One suitable form for these shoes I shall hereinafter more particularly describe. The shoes are here shown as supported from the vehicle frame on substantially Z-shaped brackets 7, one of the parallel arms of the Z being secured to the frame and the other passing through the ears 9 of the shoes 5. The two shoes may be connected by a member or brace 11 corresponding in position generally to the chord above mentioned. It will be noted that the two shoes 5 are pivoted on parallel axes to the end of the brace 11, these axes extending perpendicularly to the plane of the rim 3.

To clamp the tire or rim in position on the support 1, a shoe 13, provided with a seat to receive the interior surface of the rim, is disposed diametrically opposite the support and an extensible connection is provided between the brace 11 and the shoe 13 to force the same apart and so increase the effective diameter of the circle drawn through the three shoes and firmly expand the entire holder into gripping engagement with the rim 3. As herein shown, the expansible connection referred to comprises a rod 15 secured to the brace 11 conveniently as shown by a pivotal connection and a rod 17 secured to the shoe 13 preferably also by a pivotal connection permitting transverse swinging of the shoe for reasons which will hereinafter appear, and herein these rods are threaded with right hand and left hand threads respectively and a turnbuckle, here in a double acting turnbuckle 19 provided with handles 21 in the manner of a wing-nut, is provided to move the two rods to and from each other.

A bracket 23 may be secured to the frame of the vehicle having an eye 25 or equivalent device adapted to receive one of the rods, herein the rod 17, and hold the shoe 13 in position in the same plane as the two shoes 5, that plane coinciding with the central plane of the rim 3.

Referring particularly to Figs. 2, 3 and 4, it will be seen that I provide a lock denoted generally by the reference numeral 27 adapted to be controlled by a key 29 for locking the turnbuckle 19 and rendering it inoperable. This lock may be and preferably is of the type known as a Yale lock and includes the rotary, toothed, pinion-like member 31 coöperating with the toothed, rack-like bolt 33. As the member 31 is rotated by means of the key the bolt will, of course, be drawn in and out like the usual bolt of a lock. As best shown in Figs. 2 and 4 one of the rods, herein the rod 15, is formed with a square sided slot 35 in which the flattened end of the bolt 33 is adapted to fit. When the parts are in the position shown in Fig. 2, the bolt will be disposed in the slot 33 and the male and female screws will be locked together against rotation. When the key is turned the bolt 33 will be drawn clear of the slot and the turnbuckle may be rotated by the handles 21 either to draw the shoe 13 toward the brace 11 to permit the removal of the rim or to press it away from the brace to lock the rim in position.

The brace 11 in combination with the expansible connection formed by the rods 15 and 17 and the coöperating turnbuckle 19 forms an expansible and contractible framework connecting the set of three shoes 5 and 13 and adapted to cause relative movement among the same to clamp the tire-holding rim in place thereon.

The pivoting of the shoes 5 on axes perpendicular to the plane of the rim to be carried, as is done in the embodiment of the invention here shown, permits the shoes to adjust themselves to the curvature of the rim. It is possible to utilize a single holder for tires of different sizes and in manufacturing the same, even although for tires of greatly differing diameters, the shoes 5 and brace 11 do not have to be changed but merely the length of one of the connecting rods 15 or 17 increased. The pivoting of the two shoes 5 will permit the seating faces of all three shoes to be disposed in substantial coincidence with the circumference of any circle.

Referring to Figs. 5 and 6 I have there shown a suitable form for the shoes 5, particularly adapted for use with demountable or removable rims 3 of the kind shown which present an inwardly opening circumferential groove and designed to support either one or more of such rims in the neatest manner.

In order that the structure may be more readily understood, I show in Fig. 7 a rim of this type mounted in the usual way on a wheel felly 39 having a felly band 41. The rim 3 is provided on its inner surface with beveled circumferential ribs 43 defining between them the groove referred to. One of the ribs 43 is adapted to fit against the beveled flange 45 of the felly band and the other coöperates with the wedge ring 47 which holds the rim in place on the wheel.

When utilizing my improved form of holder in connection with rims of this kind, I preferably form the shoes 5 as shown in Figs. 5 and 6 with an odd number, herein three, of outwardly projecting portions 49 spaced from each other transversely of the plane in which a rim mounted on the support lies. The shoe 13 may be similarly constructed as will be readily understood. The projections 49 are adapted to enter and fit the groove 37 defined between ribs 43. If one rim is to be carried it is preferably mounted on the central projections of the several shoes as shown in Fig. 6. If two are to be carried they are mounted on the lateral projections as shown in Fig. 5 which are sufficiently spaced to accommodate the rims side by side as shown. By this means a holder is provided easily accommodating either one or two rims yet of small size. Furthermore, since in the embodiment shown the expanding frame is connected centrally to shoes 5 and 13, uniformity of clamping pressure on either one or two shoes is assured. The pivotal connection of the shoe 13 to the rod 17 permits the same to swing and adapt itself to the number of rims mounted upon the several shoes, so that the pressure thereon is equalized and made uniform when the turnbuckle is manipulated.

From this description of one embodiment of my invention, it will be seen that I provide a simple and strong holder for supporting a tire and one which may conveniently be securely locked to hold the same. Having described one mechanical embodiment of my novel device, what I claim and desire to secure by Letters Patent is:

1. A tire holder comprising a bar corresponding to a chord of the tire, shoes pivoted thereto on transverse axes, a member adjustable in length extending from said bar and carrying a shoe and means for locking said member in adjusted position.

2. A tire holding mechanism comprising rods having offset ends, one end of each rod being secured to a vehicle and the other end having a shoe journaled thereon, said shoes being adapted to engage a rim at the extremities of a chord thereof, and a radially adjustable shoe arranged opposite said chord.

3. A tire holding mechanism comprising rods having offset ends, one end of each rod being secured to a vehicle and the other end having a shoe journaled thereon, a brace between said other ends, an extensible arm extending from said brace and carrying a rim engaging shoe and positioning means for said arm.

4. A tire holder comprising a set of three shoes having seats to engage a rim interiorly, two of said shoes being pivoted on parallel axes substantially perpendicular to the plane of the rim, a frame-work between said shoes disposed substantially in a plane perpendicular to said axes, said frame being adjustable to vary the diameter of the circle drawn through said shoes.

5. A device of the class described designed particularly for holding demountable rims which present a circumferential groove at their inner surfaces, comprising a set of spaced shoes, means for relatively moving the same divergently to clamp a rim from the interior thereof, and means for supporting the assemblage from a vehicle or the like, said shoes having an odd number of outwardly projecting portions each adapted to enter the groove of a rim and spaced transversely of the plane of a rim mounted thereon to accommodate rims between or on adjacent alternate projections.

6. A device of the class described comprising a set of shoes, the outer surfaces thereof being formed at their middle portions and symmetrically at either side thereof with means to interlock transversely with the interior circumference of a rim, and a frame-work movable to press said shoes outwardly against a rim mounted thereon, said frame-work being connected to the shoes beneath said middle interlocking portion and midway between the lateral interlocking portions whereby even pressure on one or more rims is assured.

7. A device of the class described comprising a set of members for engaging rims from the interior thereof, said members having their outer surfaces formed with central and lateral portions each adapted to interlock transversely with a rim and spaced to accommodate rims between or on adjacent alternate portions, and means for relatively moving said shoes to clamp a rim from the interior.

8. A device of the class described comprising a support for engaging rims from the interior thereof having central and lateral portions each adapted to interlock transversely with a rim and spaced to accommodate rims between or on adjacent alternate portions, a diametrically opposed shoe having similar portions and pivoted to swing transversely to equalize pressure thereof on one or more rims and means for moving said shoe toward or from the support.

In testimony whereof I have signed my name to this specification.

CARL GUSTAVE GRONQUIST